United States Patent
Farhoud et al.

(10) Patent No.: US 10,551,481 B2
(45) Date of Patent: Feb. 4, 2020

(54) RADAR SENSOR

(71) Applicant: Hella KGaA Hueck & Co., Lippstadt (DE)

(72) Inventors: Ridha Farhoud, Laatzen (DE); Ernst Warsitz, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 353 days.

(21) Appl. No.: 15/514,692

(22) PCT Filed: Sep. 25, 2015

(86) PCT No.: PCT/EP2015/072086
§ 371 (c)(1),
(2) Date: Mar. 27, 2017

(87) PCT Pub. No.: WO2016/050628
PCT Pub. Date: Apr. 7, 2016

(65) Prior Publication Data
US 2017/0234967 A1    Aug. 17, 2017

(30) Foreign Application Priority Data

Sep. 29, 2014   (DE) .................. 10 2014 114 110

(51) Int. Cl.
*G01S 7/02* (2006.01)
*G01S 13/93* (2006.01)
*G01S 13/931* (2020.01)

(52) U.S. Cl.
CPC ........... *G01S 7/023* (2013.01); *G01S 13/931* (2013.01)

(58) Field of Classification Search
CPC . G01S 7/021; G01S 7/023; G01S 7/36; G01S 13/282; G01S 13/34; G01S 13/343; G01S 13/347; G01S 13/931; G01S 13/584
See application file for complete search history.

(56) References Cited

U.S. PATENT DOCUMENTS 4,528,565 A * 7/1985 Hauptmann .......... G01S 13/522
342/203
5,973,636 A * 10/1999 Okubo .................... G01S 7/032
342/109

(Continued)

FOREIGN PATENT DOCUMENTS

| DE | 102009047931 A1 | 4/2011 |
|---|---|---|
| DE | 102012021240 A1 | 4/2014 |
| WO | 2013/051944 A1 | 4/2013 |

OTHER PUBLICATIONS

Rios, J.J. u.A.: "Application of Linear Predictive Coding for Human Activity Classification Based on Micro-Doppler Signatures." In: IEEE Geoscience and Remote Sensing Letters, vol. 11, No. 10, Oct. 2014, S. 1831-1834.

*Primary Examiner* — Peter M Bythrow
(74) *Attorney, Agent, or Firm* — Husch Blackwell LLP

(57) ABSTRACT

A radar sensor having a signal generating device which generates an outgoing signal as a radar signal that is to be emitted. The radar sensor also has a signal receiving device for receiving and processing received signals as reflected radar signals. The received signals can be processed with a prediction method in order to determine a predicted signal, which can be compared to the received signal in order to eliminate disruptions deviating therefrom.

9 Claims, 3 Drawing Sheets

(56) References Cited

U.S. PATENT DOCUMENTS 5,999,118 A * 12/1999 Hethuin ............... G01S 13/34
                                                                   342/122
6,121,918 A * 9/2000 Tullsson ............... G01S 7/023
                                                                   342/128

* cited by examiner

RADAR SENSOR

CROSS REFERENCE

This application claims priority to PCT Patent Application No. PCT/EP2015/072086, filed 25 Sep. 2015, which itself claims priority to German Application No. 10 2014 114110.5, filed 29 Sep. 2014, the entirety of both of which are hereby incorporated by reference.

FIELD OF THE INVENTION

The invention relates to a radar sensor, in particular a radar sensor for a motor vehicle.

BACKGROUND OF THE INVENTION

Radar sensors are used in motor vehicles with increasing frequency. Such radar sensors are used, for example, in vehicle assistance systems in order to reliably detect oncoming traffic, or approaching vehicles, for example, at greater distances, and to be able to determine as precisely as possible their position and speed, or relative speed and azimuth angle. Radar sensors are also used to monitor the closer proximity of the motor vehicle.

Radar sensors are currently used that generate an outgoing signal, which is emitted, and receive and process the outgoing signal reflected by objects as an incoming signal. The outgoing signal is a series of individual signals having a predetermined time period and frequency, also referred to as a "burst," which vary in frequency from one individual signal to the next individual signal.

The radar sensors are operated, for example, with the so-called LFMSK transmission method (Linear Frequency Modulated Shift Keying). With this method, three nested individual signals A, B, C are emitted. For a time period of ca. 25 μs (burst) in each case, a constant frequency is emitted thereby, which is then modified linearly for each of the three individual signals. An increasing frequency is referred to as an up-chirp, and a decreasing frequency is referred to as a down-chirp. In addition to the up-chirp and the down-chirp, a mono-frequency individual signal, the so-called Doppler-chirp, is used.

Due to the limitation of the permissible frequency range for automotive applications, and the simultaneous increased used of such radar sensors, the probability increases that vehicles equipped with radar sensors will interfere with each other. In the event of such an interference, the receiver-side radar sensor (victim) also receives, in addition to its own outgoing signal, the outgoing signal of another radar sensor (disrupter).

This results in erroneous evaluations, when the outgoing signal of the disrupter is regarded as the reflected outgoing signal of its own radar sensor.

SUMMARY OF THE INVENTION

For this reason, the objective of the present invention is to create a radar sensor that is an improvement on the prior art. A corresponding method for operating such a radar sensor is also to be created.

One exemplary embodiment of the invention relates to a radar sensor having a signal generating device, which generates a signal as an outgoing radar signal as a signal that is to be emitted, having a signal receiving device for receiving and for processing received signals as reflected radar signals, wherein the received signals can be processed with a prediction method, in order to establish a predicted signal, to which the received signal can be compared, in order to reduce or eliminate disruptions deviating therefrom.

An exemplary embodiment relates to a method for operating a radar sensor, in particular a radar sensor according to the invention above, wherein the radar sensor is provided with a signal generating device, which generates an outgoing signal as a radar signal that is to be emitted, having a signal receiving device for receiving and for processing received signals as reflected radar signals, wherein the received signal is processed with a prediction method, in order to establish a predicted signal, to which the received signal is compared, in order to reduce or eliminate disruptions deviating therefrom. As a result, the disruption is detected and the signal expected without a disruption is established by means of the prediction.

It is particularly advantageous when the received signal or a mixed received signal depicts a signal similar to a predicted sinusoidal curve in a time period. As a result, it is possible to anticipate the expected predicted signal.

It is particularly advantageous thereby when a linear predictive encoding is carried out. As a result, the prediction is easy to carry out, because it can be done with a simple calculation, which reduces computing capacity, and the prediction is directed at the future in a simple manner.

It is particularly advantageous thereby when discontinuities in the received signal or in a mixed received signal due to interferences are detected through evaluation of the prediction error. Thus, it can be assumed that there is a discontinuity in the received signal if there is a significant increase in the prediction error, such that it can be concluded that there is a disruption due to interferences.

It is particularly advantageous when the prediction error can be used as a test value. In this manner, the presence of disruptions can be detected easily.

It is particularly advantageous when the prediction error is calculated by comparing the actual signal amplitude x(k) with the predicted value x̂(k).

It is also advantageous when optionally, in addition to the causal forward prediction, a non-causal reverse prediction is used. As a result, the prediction can be improved when more than one method is used for the prediction.

It is also advantageous when the amplitude value that is to be predicted is determined from the weighted average of the two prediction results. The methods that are used can thus be weighted in relation to one another, in order to obtain an optimized prediction result.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
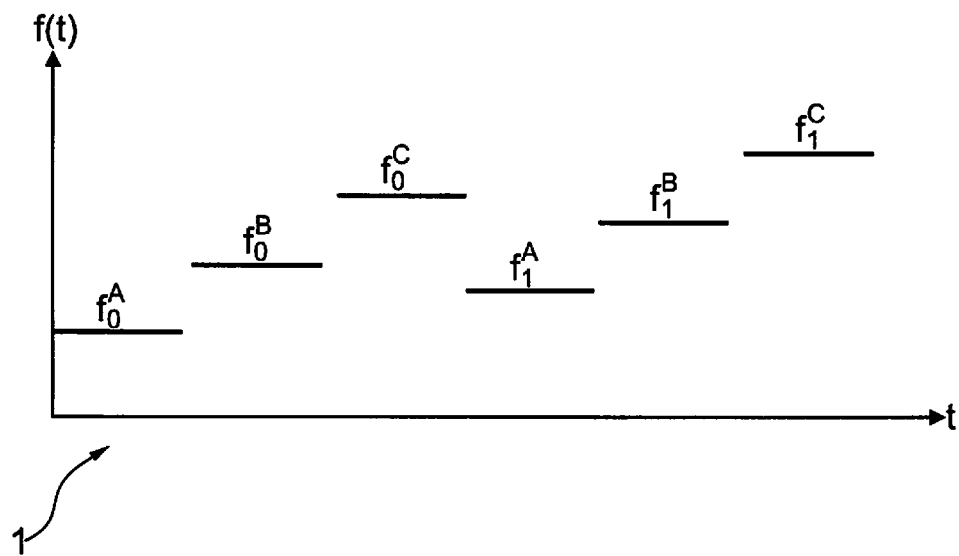
FIG. 1 shows a diagram with an emission signal.

FIG. 1 shows a diagram 1 for illustrating an outgoing signal comprised of a series of individual signals. The diagram shows the frequency f(t) of the outgoing signal as a function of time t. The individual signals $f_0^A$, $f_0^B$, $f_0^C$, $f_1^A$, $f_1^B$, $f_1^C$, etc. form a series emitted as an outgoing signal. If the radar transmission sensor is operated with the so-called LFMSK transmission method (Linear Frequency Modulated Shift Keying), three nested individual signals A, B, C are emitted. A constant frequency is emitted thereby for a time period of ca. 25 μs (burst) in each case, which is then modified linearly for each of the three individual signals. It should be noted thereby that the frequencies of the signals $f_0^A$, $f_0^B$, $f_0^C$ increase, wherein the frequencies in the next series of signals $f_1^A$, $f_1^B$, $f_1^C$ increase again, wherein the frequency $f_1^A$ is greater than the frequency $f_0^A$. An increasing frequency is referred to as an up-chirp, and a decreasing frequency is referred to as a down-chirp. In addition to the up-chirp and down-chirp, a mono-frequency individual signal, the so-called Doppler-chirp, is also used. The three signal types are used alternatingly thereby. In the example in FIG. 1, only up-chirps are used. Down-chirps or Doppler-chirps could also be used, however.

Figure 2:
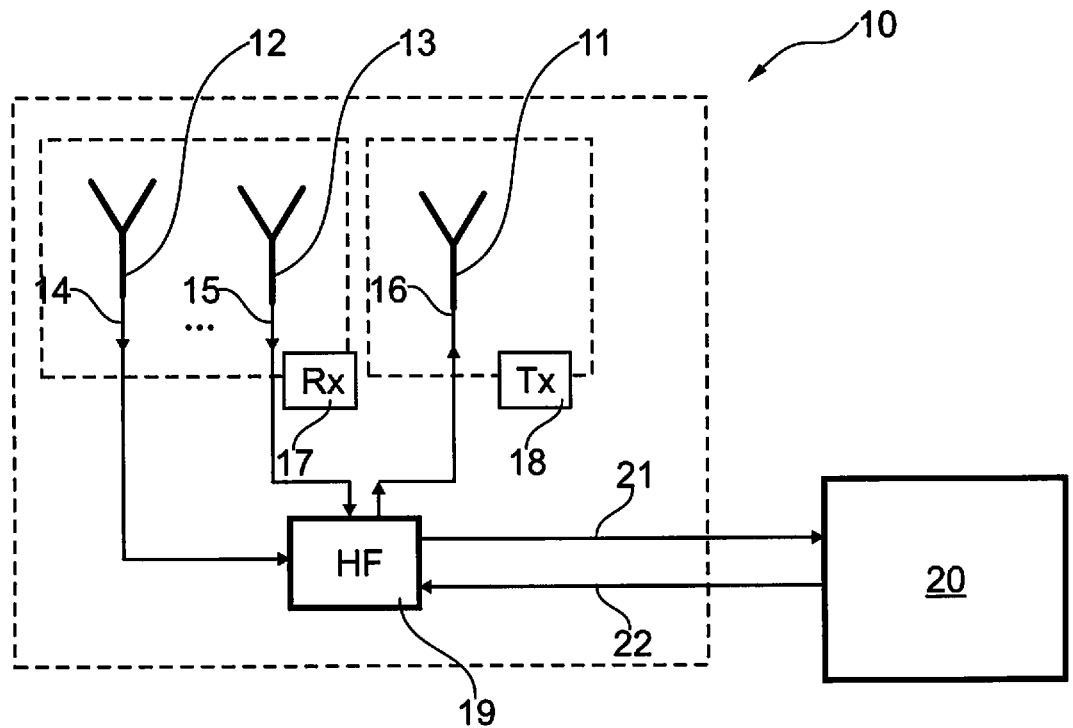
FIG. 2 shows a schematic depiction of a radar sensor.

FIG. 2 shows a schematic depiction of a radar sensor 10, which has a transmitting antenna 11 and two receiving antennas 12, 13. The reflected received signals 14, 15 are mixed in the receivers 17 with the outgoing signal 16 of the transmitter 18, and the frequency range is transformed. This signal 21 is mixed in an HF element 19, and transferred to the digital signal processor 20 for further evaluation. The digital signal processor 20 transmits control signals 22 for controlling the radar sensor to the HF element 19. The radar sensor 10 thus has a signal generating device thereby, which includes the transmitter 16, the HF element 19 and the signal processor 20. The radar sensor 10 also has a signal receiving device thereby, which includes the receiver 17, the HF element 19 and the signal processor 20.

The received signals 14, 15 represents a superimposing of reflections from relevant targets, but also reflections from undesired targets, also referred to in radar technology as clutter, so-called disruption echoes caused by reflections on the ground, shoulder constructions and by rain. The OS-CFAR method (Ordered Statistic—Constant False Alarm Rate) is used to detect the relevant targets. Following detection, a basis signal is obtained for a relevant target, the frequency of which is obtained from the distance to the target and its relative speed. With a Doppler-chirp, the frequency is merely a function of the relative speed. The phase difference between the spectral components in the baseband between two ramps in each case is likewise obtained from the distance to and the relative speed of the relevant target. By solving a linear equation, the distance to and the relative speed of the target can be determined from the frequency and this phase difference for each measurement cycle. Furthermore, the run-time difference of the reflected signal, and thus the angle of incidence, can be determined by means of the phase difference between the two receiving antennas at the position of the frequency that is to be evaluated.

Raw target parameters can be determined from these signals, possibly using further data, which can be used for identifying objects by means of subordinate processing steps. The signal level and/or a reliability of the generated value can be used advantageously for further data.

Figure 3:
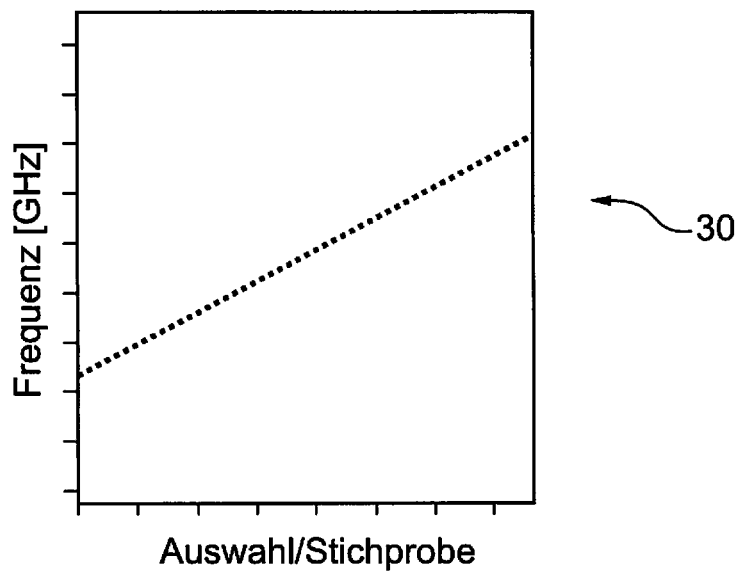
FIG. 3 shows a diagram of a signal curve.
Figure 4:
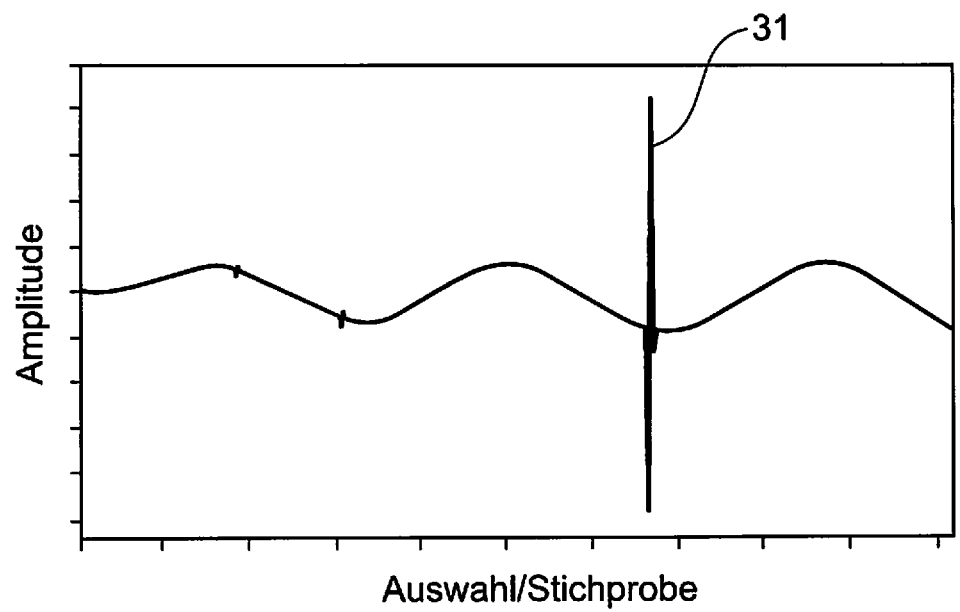
FIG. 4 shows a diagram of a signal curve.

FIGS. 3 and 4 show a signal curve 30 with a disruption. FIG. 3 shows an up-chirp in the frequency/time diagram, intersected by a CW disrupter. The CW disruption results in a pulse-like increase 31 in the amplitude of the time signal in the region of the intersection points of both signals, see FIG. 4. This increase 31, which can also extend over numerous measurement points, causes a broadband increase in the noise in the frequency range. Reflections from relevant targets are masked as a result, and can no longer be detected in the series.

The CW disruption is an example of a disruption thereby. Other disruptions could also occur. More complex disruptions could be caused, for example, by LFMCW (Linear Frequency Modulated Continuous Wave) and FCSM (Fast Chip Sequence Modulation). With these disruptions, there are increased intersections between the outgoing signal of the victim and the interference signal in the frequency curve.

As a result, disruptions in the form of an amplitude increase can be received in numerous time windows, which increase the noise level such that a detection of relevant targets without a correction of the received signal becomes difficult.

Because the receiving antennas are subject to different antenna diagrams due to manufacturing variances and asymmetrical couplings, the effects of the disruptions on the wanted signal in the two receiving antennas may also be different. In an exemplary case, only one of the two receiving antennas is disrupted. Furthermore, depending on the disruption, either just one, or all three A-, B-, and C-ramps may be affected. This may be attributed to the fact that the three ramps have different frequencies, and are temporally offset, see FIG. 1. Thus, by way of example, with a narrow-band Doppler disrupter having the same Doppler frequency in the range of ramp A, the frequencies of only this ramp are strongly disrupted. The disruptions of the two other ramps are caused by the harmonics of the disrupter, and frequently cannot be detected, due to the low disruption intensity.

In order to enable an errorless detection of the reflections from relevant targets in the receiving spectrum, disruptions must be detected and eliminated.

Because it is sufficient to detect the disruption in just one of the six ramps with three ramps per receiving antenna, signals can also be corrected in which the disruption is not measured directly.

Because the time signal of each target object that is to be detected corresponds after the mixing stage to a sine function or a sinusoidal signal, as a superimposing of sine signals, the received signal, depicting the superimposing of all of the reflections of the target reflecting the outgoing signal, is composed only of harmonic oscillations. This signal shape of the harmonic oscillations can be readily predicted using a linear predictor.

The method of the linear predictive encoding LPC (Linear Predictive Coding) predicts the future curve of a signal based on the preceding signal values. A linear combination is formed from the preceding sampling values thereby.

Accordingly, for the predicted value at point k:

$$\hat{x}(k) = \sum_{i=1}^{n} a_i x(k - i)$$

wherein $a_i$ represent the prediction coefficients with i=1 to n.

These prediction coefficients are determined using a correlation matrix. For this, a correlation is formed from the preceding signal values, containing data regarding the signal characteristic. Based on this signal characteristic, the future curve of the signal can then be predicted on the basis of the last value.

Discontinuities in the received signal due to interferences can be detected by evaluating the prediction error, or the LPC prediction error. This prediction error is thus used as a test value.

The prediction error can be calculated according to the following equation, through comparison of the actual signal amplitude x(k) with the predicted value x̂(k):

$$e(k) = x(k) - \hat{x}(k) = x(k) - \sum_{i=1}^{n} a_i x(k-i)$$

In the case of a disruption, there is an increased prediction error due to the discontinuity, which can be determined.

With the detection through linear prediction, the entire signal curve of the examined chirp is predicted. The estimated value is then compared with the actual signal value. Using a suitable threshold value, a detection criterion can be derived in order to determine a discontinuity.

A pulse-shaped disruption in the signal is subsequently repaired using the preceding, undisrupted signal values. This repair is obtained through the forward projection of the predicted curve without the effect of the disruption.

In order to prevent amplitude jumps, a non-causal backward prediction can optionally also be used, in addition to the causal forward prediction. The amplitude value that is to be predicted is to be subsequently determined from the weighted averaging of both prediction results.

Figure 5:
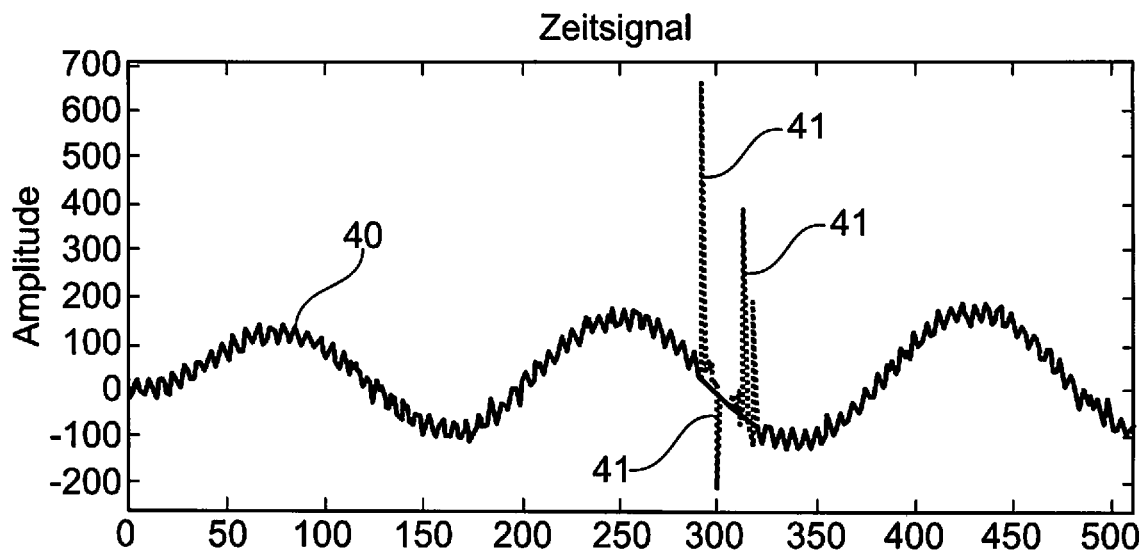
FIG. 5 shows a diagram of a disrupted signal.
Figure 6:
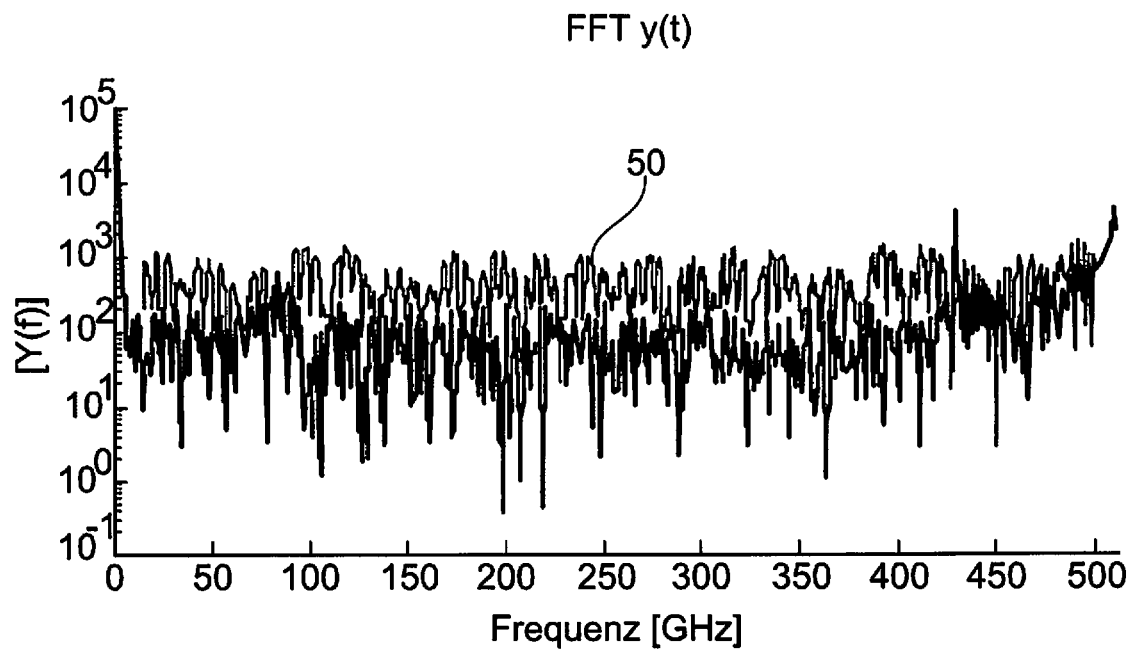
FIG. 6 shows a diagram of a signal curve after reduction of interference.

The result of the above interference reduction can be seen in FIGS. 5 and 6.

FIG. 5 shows a sinusoidal signal curve 40 having discontinuous, pulse-like rises 41 due to disruptions. After the prediction and the determination of the sinusoidal portions, the disruptions in the corrected signal 50 of FIG. 6 can no longer be detected. The reduction of the error also results in a reduction of the noise level. Masked relevant targets in the frequency range of the received signal can only be detected using the corrected signal.

LIST OF REFERENCE SYMBOLS

1 diagram
10 radar sensor
11 transmitting antenna
12 receiving antenna
13 receiving antenna
14 signal
15 signal
16 outgoing signal
17 receiver
18 transmitter
19 HF element
20 signal processor
21 signal
22 control signal
30 signal curve
31 rise
40 signal curve
41 increase
50 corrected signal

The invention claimed is:

1. A radar sensor comprising:
a signal generating device, which generates an outgoing signal as a radar signal that is to be emitted;
a signal receiving device for receiving and processing received signals as reflected radar signals, wherein the received signals include a signal curve,
wherein the received signals are processed with a prediction method in order to determine a predicted signal for the entire signal curve, with which the received signal is compared in order to reduced disruptions deviating therefrom.

2. A method for operating a radar sensor comprising the steps of:
providing the radar sensor with a signal generating device;
generating an outgoing signal via the signal generating device as a radar signal that is to be emitted;
providing the radar sensor with a signal receiving device;
receiving and processing received signals via the signal receiving device as reflected radar signals, wherein the received reflected radar signal includes a signal curve,
processing the received reflected radar signals with a prediction method in order to determine a predicted signal for the entire signal curve, which is compared with the received reflected radar signal in order to reduce disruptions deviating therefrom.

3. The method according to claim 2, wherein the predicted signal is sinusoidal, and wherein the received reflected radar signal or a mixed received signal is similar to the predicted sinusoidal signal.

4. The method according to claim 2 wherein a linear predictive encoding is carried out.

5. The radar sensor according to claim 3 further comprising the step of detecting discontinuities in the received reflected radar signal or in the mixed received signal caused by interferences through evaluation of a prediction error.

6. The method according to claim 5, wherein the prediction error is used as a test value for detecting the discontinuities in the received reflected radar signal or in the mixed received signal, and wherein an increase in the prediction error represents a discontinuity.

7. The method according to claim 5 wherein the prediction error is calculated based on a comparison of the actual signal amplitude with the predicted value of the signal amplitude.

8. The method according to claim 2 wherein a non-causal backward prediction is used in addition to a causal forward prediction.

9. The method according to claim 8, wherein an amplitude value that is to be predicted is determined from a weighted averaging of two prediction results.

* * * * *